(12) United States Patent
Girard

(10) Patent No.: US 7,093,124 B2
(45) Date of Patent: Aug. 15, 2006

(54) MECHANISM TO IMPROVE AUTHENTICATION FOR REMOTE MANAGEMENT OF A COMPUTER SYSTEM

(75) Inventor: Luke E. Girard, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 837 days.

(21) Appl. No.: 10/002,337

(22) Filed: Oct. 30, 2001

(65) Prior Publication Data

US 2003/0084342 A1     May 1, 2003

(51) Int. Cl.
*H04L 9/00*     (2006.01)
*G06F 9/00*     (2006.01)
*G06F 7/04*     (2006.01)

(52) U.S. Cl. .................. 713/164; 713/2; 726/4
(58) Field of Classification Search ................ 713/201
See application file for complete search history.

(56) References Cited

U.S. PATENT DOCUMENTS

| | | | | |
|---|---|---|---|---|
| 5,953,422 | A * | 9/1999 | Angelo et al. | 713/185 |
| 5,961,588 | A * | 10/1999 | Cooper et al. | 709/203 |
| 5,974,250 | A * | 10/1999 | Angelo et al. | 713/100 |
| 5,978,912 | A * | 11/1999 | Rakavy et al. | 713/2 |
| 6,012,100 | A * | 1/2000 | Frailong et al. | 709/250 |
| 6,223,284 | B1 * | 4/2001 | Novoa et al. | 713/100 |
| 6,684,326 | B1 * | 1/2004 | Cromer et al. | 713/2 |
| 2001/0002485 | A1 * | 5/2001 | Bisbee et al. | 713/167 |

OTHER PUBLICATIONS

Microsoft Computer Dictionary, Fifth Edition, 2002, p. 39.*

* cited by examiner

*Primary Examiner*—Gilberto Barron, Jr.
*Assistant Examiner*—Kristin Derwich
(74) *Attorney, Agent, or Firm*—Blakely, Sokoloff, Taylor & Zafman LLP

(57) ABSTRACT

According to one embodiment, a network is disclosed. The network includes a server computer and a client computer. The client computer accesses an authentication stack during power on self test (POST) that enables authentication of boot code that is to be downloaded from the server computer prior to control being passed to the operating system.

15 Claims, 6 Drawing Sheets

MECHANISM TO IMPROVE AUTHENTICATION FOR REMOTE MANAGEMENT OF A COMPUTER SYSTEM

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to computer systems; more particularly, the present invention relates to the protection of data on a personal computer.

BACKGROUND

Wired for Management (WfM) Specification Version 2.0, developed by Intel Corporation of Santa Clara, Calif., enables computer systems to be universally managed over networks without sacrificing agility or performance. WfM defines a mechanism called Preboot Execution Environment (PXE) that bypasses the operating system transition in the computer system basic input output system (BIOS) in order to find a server on the network (boot server) to download and execute code, instead of loading the operating system from the boot device on the computer system. Another component of PXE technology makes it possible to configure or reconfigure a computer system remotely, even with a blank hard disk drive. The computer system typically has a universal service agent loaded locally in the BIOS and/or LAN adapter.

This agent enables, for example, the system to interact with a remote server in order to dynamically retrieve the requested boot image across the network, making it possible to install the operating system and user configuration of a new system without a technician present. PXE is tamper-resistant through a Boot Integrity Services (BIS) application program interface (API) that offers security-oriented services for the pre-boot environment. BIS is implemented in the BIOS of the target computer system to verify the integrity of a downloaded to the computer system. If the credentials do not match those previously recorded in non-volatile storage, the new boot image is not executed.

A problem, however, may occur in mobile computer systems (e.g., notebooks), or other power-managed platforms where the computer system may be in a low power sleep state. The problem occurs if the platform wakes up from the low power sleep state and has to re-authenticate the user or platform in BIOS. Similarly, the remote server may need to wake up the computer system to perform management services. Since a user may not be present during the wake-up, the client computer has to authenticate the remote server as though the remote server was the local user and verify what the remote server is authorized to do.

WfM PXE/BIS code does not load or get control until the end of the power on self-test (POST) stage of the boot process. As a result, the computer system often hangs up. Moreover, the problem is exacerbated by the fact that when AT attachment 3 (ATA-3) password enabled hard disk drives lose power during the low power sleep state, or in a C3 state wherein the hard disk drive is asleep. In such a scenario the disk drives do not recall the password that is needed to allow access to media commands.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
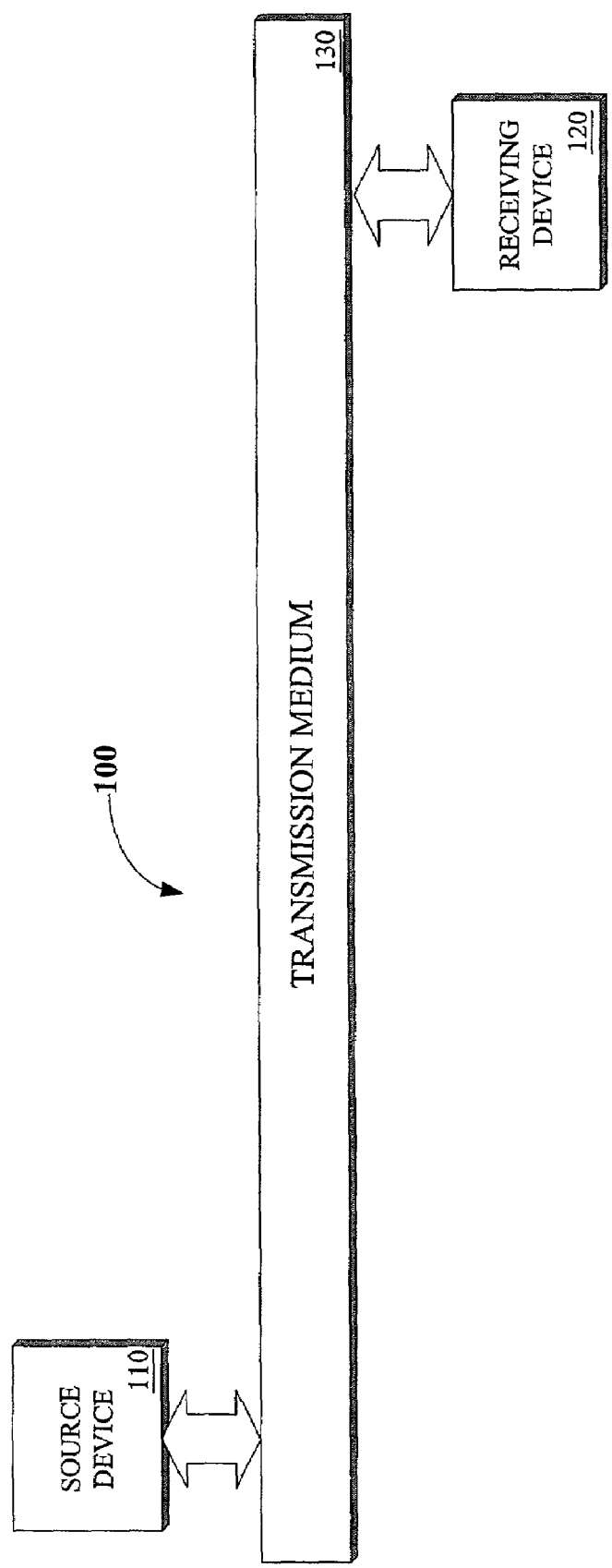
FIG. 1 illustrates one embodiment of a network.

A mechanism to improve authentication for remote management of a computer system is described. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), execution cores, etc.).

FIG. 1 illustrates one embodiment of a network 100. Network 100 includes a computer system 110 and a computer system 120 coupled via a transmission medium 130. In one embodiment, computer system 110 operates as a source device that sends an object to computer system 120, operating as a receiving device. The object may be, for example, a data file, an executable, or other digital objects. The object is sent via data transmission medium 130. The data transmission medium 130 may be one of many mediums such as an internal network connection, an Internet connection, or other connections. The transmission medium 130 may be connected to a plurality of untrusted routers (not shown) and switches (not shown).

Figure 2:
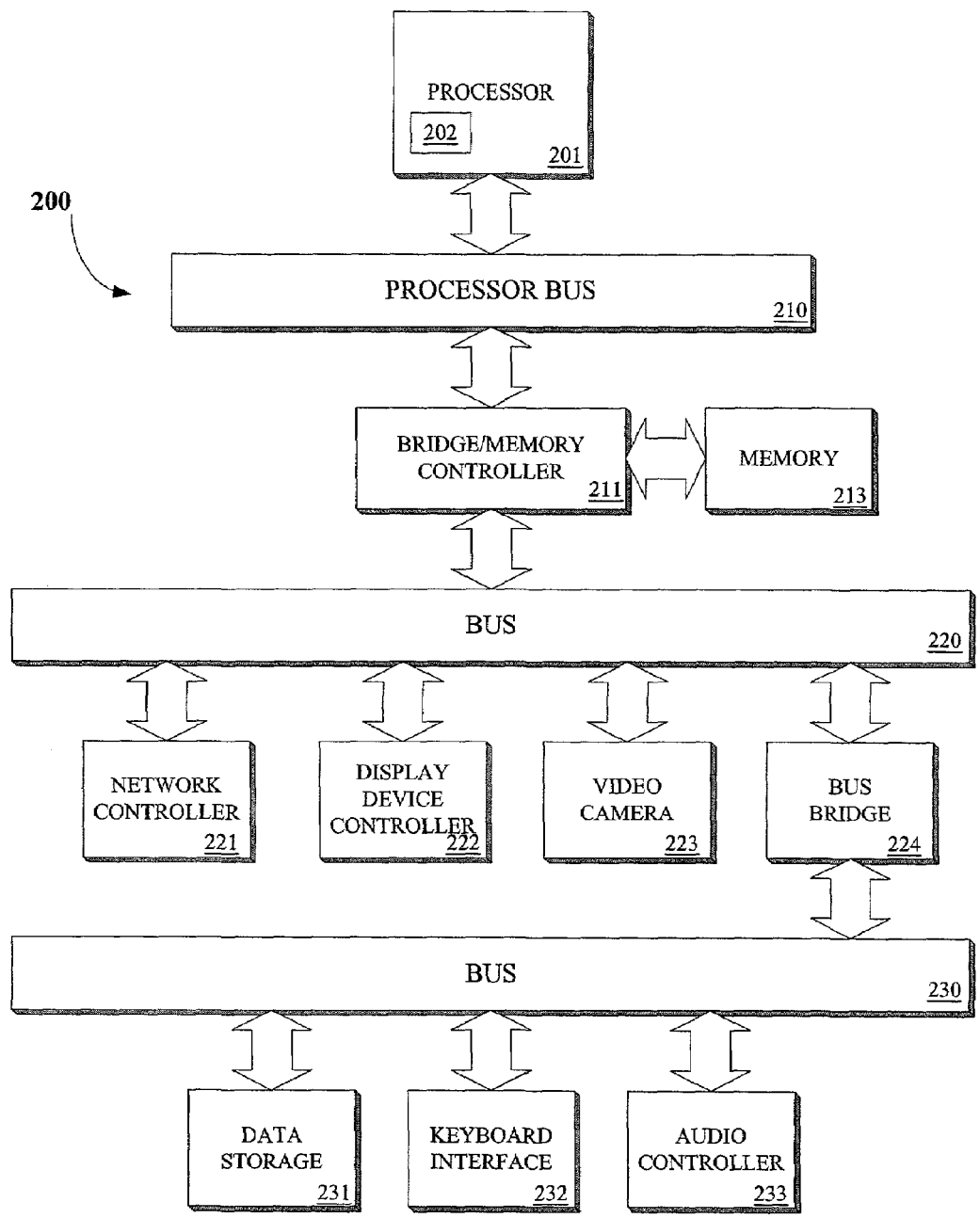
FIG. 2 is a block diagram of one embodiment of a computer system.

FIG. 2 is a block diagram of one embodiment of a computer system 200. Computer system 200 may be implemented as computer system 110 or computer system 120 (both shown in FIG. 1). The computer system 200 includes a processor 201 that processes data signals. Processor 201 may be a complex instruction set computer (CISC) microprocessor, a reduced instruction set computing (RISC) microprocessor, a very long instruction word (VLIW) microprocessor, a processor implementing a combination of instruction sets, or other processor device.

In one embodiment, processor 201 is a processor in the Pentium® family of processors including the Pentium® II family and mobile Pentium® and Pentium® II processors available from Intel Corporation of Santa Clara, Calif. Alternatively, other processors may be used. FIG. 2 shows an example of a computer system 200 employing a single processor computer. However, one of ordinary skill in the art will appreciate that computer system 200 may be implemented using multiple processors.

Processor 201 is coupled to a processor bus 210. Processor bus 210 transmits data signals between processor 201 and other components in computer system 200. Computer system 200 also includes a memory 213. In one embodiment, memory 213 is a dynamic random access memory (DRAM) device. However, in other embodiments, memory 213 may be a static random access memory (SRAM) device, or other memory device. Memory 213 may store instructions and code represented by data signals that may be executed by processor 201. According to one embodiment, a cache memory 202 resides within processor 201 and stores data signals that are also stored in memory 213. Cache 202 speeds up memory accesses by processor 201 by taking advantage of its locality of access. In another embodiment, cache 202 resides external to processor 201.

Computer system 200 further comprises a bridge memory controller 211 coupled to processor bus 210 and memory 213. Bridge/memory controller 211 directs data signals between processor 201, memory 213, and other components in computer system 200 and bridges the data signals between processor bus 210, memory 213, and a first input/output (I/O) bus 220. In one embodiment, I/O bus 220 may be a single bus or a combination of multiple buses. In a further embodiment, I/O bus 220 may be a Peripheral Component Interconnect adhering to a Specification Revision 2.1 bus developed by the PCI Special Interest Group of Portland, Oreg. In another embodiment, I/O bus 220 may be a Personal Computer Memory Card International Association (PCMCIA) bus developed by the PCMCIA of San Jose, Calif. Alternatively, other busses may be used to implement I/O bus. I/O bus 220 provides communication links between components in computer system 200.

A network controller 221 is coupled I/O bus 220. Network controller 221 links computer system 200 to a network of computers (not shown in FIG. 2) and supports communication among the machines. A display device controller 222 is also coupled to I/O bus 220. Display device controller 222 allows coupling of a display device to computer system 200, and acts as an interface between the display device and computer system 200. In one embodiment, display device controller 222 is a monochrome display adapter (MDA) card. In other embodiments, display device controller 222 may be a color graphics adapter (CGA) card, an enhanced graphics adapter (EGA) card, an extended graphics array (XGA) card or other display device controller.

The display device may be a television set, a computer monitor, a flat panel display or other display device. The display device receives data signals from processor 201 through display device controller 222 and displays the information and data signals to the user of computer system 200. A video camera 223 is also coupled to I/O bus 220.

Computer system 200 includes a second I/O bus 230 coupled to I/O bus 220 via a bus bridge 224. Bus bridge 224 operates to buffer and bridge data signals between I/O bus 220 and I/O bus 230. I/O bus 230 may be a single bus or a combination of multiple buses. In one embodiment, I/O bus 230 is an Industry Standard Architecture (ISA) Specification Revision 1.0a bus developed by International Business Machines of Armonk, N.Y. However, other bus standards may also be used, for example Extended Industry Standard Architecture (EISA) Specification Revision 3.12 developed by Compaq Computer, et al.

I/O bus 230 provides communication links between components in computer system 200. A data storage device 231 is coupled to I/O bus 230. I/O device 231 may be a hard disk drive, a floppy disk drive, a CD-ROM device, a flash memory device or other mass storage device. A keyboard interface 232 is also coupled to I/O bus 230. Keyboard interface 232 may be a keyboard controller or other keyboard interface. In addition, keyboard interface 232 may be a dedicated device or can reside in another device such as a bus controller or other controller. Keyboard interface 232 allows coupling of a keyboard to computer system 200 and transmits data signals from the keyboard to computer system 200. An audio controller is also coupled to I/O bus 230. Audio controller 233 operates to coordinate the recording and playing of sounds.

According to one embodiment, computer system 120 may be remotely booted from computer system 110 based upon a user authentication stack. At some time during the power on self-test (POST) of computer system 120, the BIOS authenticates computer system 110 as computer system 110 attempts to access computer system 120. In typical computer systems, this is done by computer system 120 requesting a password. However, there are various methods of circumventing BIOS passwords. Moreover, transmitting the system password over transmission medium 130 from computer system 110 is not a secure option.

Figure 3:
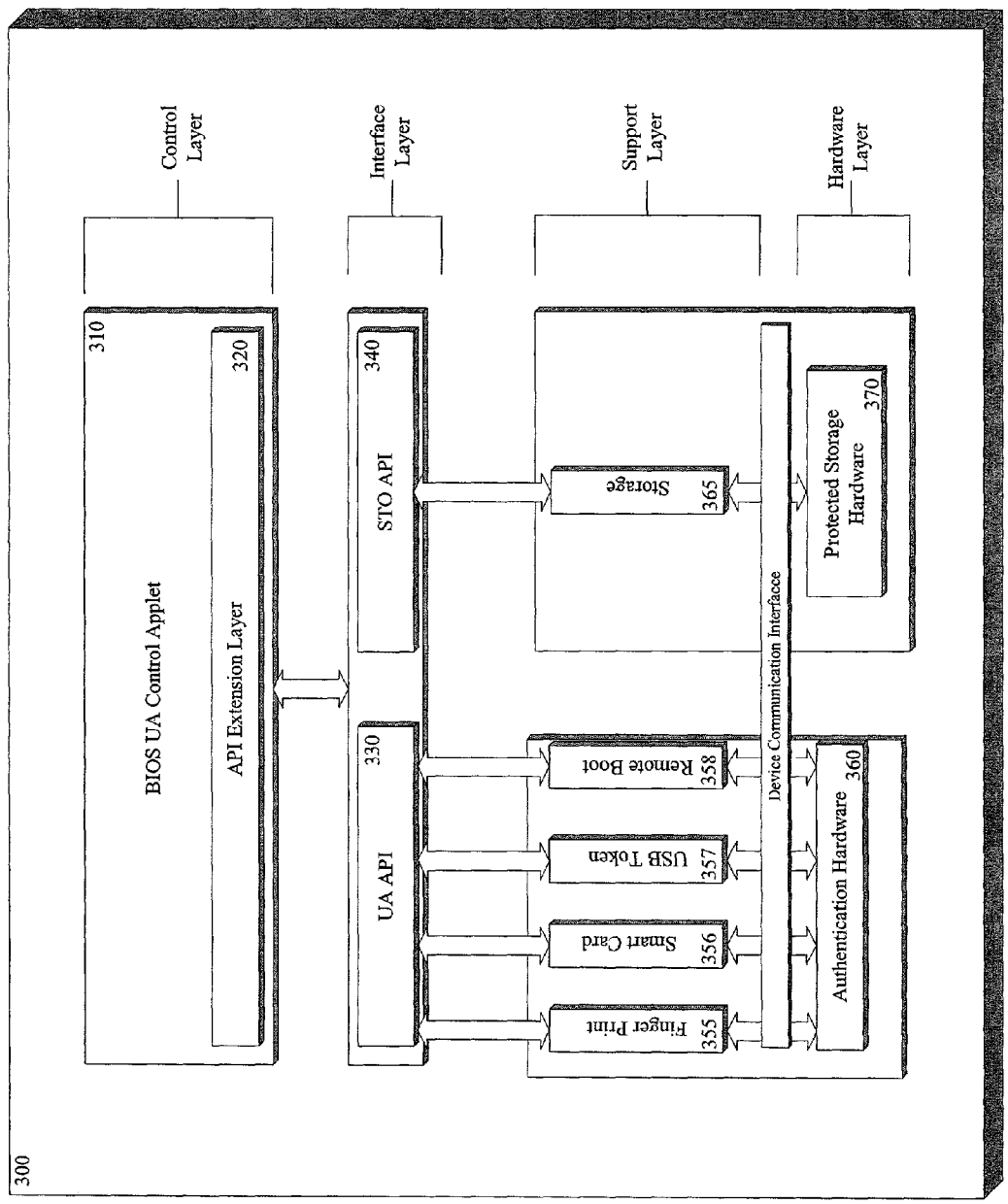
FIG. 3 is a block diagram of one embodiment of a user authentication stack.

The authorization stack improves pre-operating system user authentication by providing a modular layered architecture with a well-defined abstraction layer that conceals the details of the authentication technology that is used. FIG. 3 is a block diagram of one embodiment of a user authentication stack 300. In one embodiment, user authentication stack 300 includes a control layer, an interface (API) layer, a support layer and a hardware layer. In a further embodiment, the control and interface layers are implemented at a receiving device such as computer system 120, while the support and hardware layers are executed at a source device such as computer system 110.

In one embodiment, authentication stack 300 is enabled during the power on self-test (POST) stage of the boot sequence at computer system 120. The control layer is the master control for pre-boot user authentication. The control layer includes a BIOS user authentication (UA) control applet 310. According to one embodiment, control applet 310 is responsible for finding, interpreting and enforcing platform security policy. In one embodiment, platform policy has three components: a policy enabled by a manufacturer; a policy selected by a platform owner and a policy selected by the user of the system. The policy may be stored in a non-volatile memory within computer system 120. Policy can define how to handle security related events such as remote LAN wakeup, resume from suspend, ATA-3 locked, etc.

In addition, control applet 310 finds and configures platform authentication and storage sub-systems. Control applet 310 recognizes which methods of authenticating the user that are present. As a result, control applet 310 enumerates the software and hardware capabilities of the platform. In one embodiment, control applet 310 can compare the authentication mechanisms found with those needed by the platform policy, and subsequently make decisions on how to proceed. Control applet 310 also manages managing authentication modules and pre-operating system authentication. Control applet 310 is responsible for setting up the pre-operating system environment and loading necessary modules so that authentication resources can be used. Such resources may include decompression, entry-point tables, IRQ mapping, etc.

Further, control applet 310 conducts traffic control between the authentication and storage sub-systems. Control applet 310 makes calls to protected storage hardware within the hardware layer and transmitting the necessary information to an authentication sub-system within the hardware layer, and vice versa. Control applet 310 also prevents access conflicts. Control applet 310 also enables and configures resources to enable authentication. According to one embodiment, BIOS UA control applet 310 includes an API extension layer 320. API extension layer 320 provides API extensions in order to reduce redundancy and complexity in their control code.

The interface layer includes a UA API 330 and a storage (STO) API 340. UA API 330 defines high-level function calls needed for user authentication, while STO API 340 defines high-level function calls needed for storage. UA API 330 and STO API 340 work with all user authentication and storage devices known, regardless of the underlying technology. According to one embodiment, the interface layer supports local (e.g., CPU) subsystems, smart subsystems (e.g., protected) and remote authentication (e.g., breakup capture, extraction and verify executed partly on client and partly on server). However, the interface layer may also accommodate future authentication considerations.

The support layer provides device specific support. The support includes an authentication support component and a storage component. According to one embodiment, the support layer is developed by an authentication hardware manufacturer (or service provider). The support layer translates API calls received from the interface layer into proprietary calls of the service provider.

In one embodiment, the support layer includes API handlers and logic, proprietary libraries, BIOS interface libraries and a hardware driver (none shown). The API handlers and logic receive API function calls from control applet 310 and returns the appropriate information. According to one embodiment, the API calls are converted to a sequence of calls to the service provider's library, BIOS standard interfaces and hardware driver code. The proprietary libraries include provider specific code that recognize algorithms for a particular device. The proprietary libraries interface to standard BIOS interfaces and hardware drivers. The hardware driver contains code that communicates with a hardware device in the hardware layer.

As described above, the support layer includes authentication and storage plug-ins. The plug-ins convert the abstraction layer into a sequence of calls that implement functions in the hardware layer. The storage component includes storage plug-in 365. Storage plug-in 365 provides support for one or more hardware devices in the hardware layer. According to one embodiment, the authentication component of the support layer includes fingerprint plug-in 355, smart card plug-in 356, universal serial bus (USB) token plug-in 357 and remote boot plug-in 358.

Fingerprint plug-in 355 is used to authenticate access based upon receiving data from a fingerprint peripheral device coupled to computer system 120. Smart card plug-in 356 is used to authenticate access based upon receiving data from a smart card chip read at a smart card peripheral device coupled to computer system 120. USB token plug-in 357 is used to authenticate access based upon a USB token.

Remote boot plug-in 358 provides services during the pre-operating system process that enables computer system 110 to be authenticated by computer system 120 in order to prove that computer system 110 is authorized to boot computer system 120. Note that in other embodiments, bilateral authentication may be implemented. According to one embodiment, the WfM PXE/BIS specification is used to authenticate computer system 110 for remote services at computer system 120. In a further embodiment, the PXE/BIS services are loaded into the memory of computer system 120.

Figure 4:
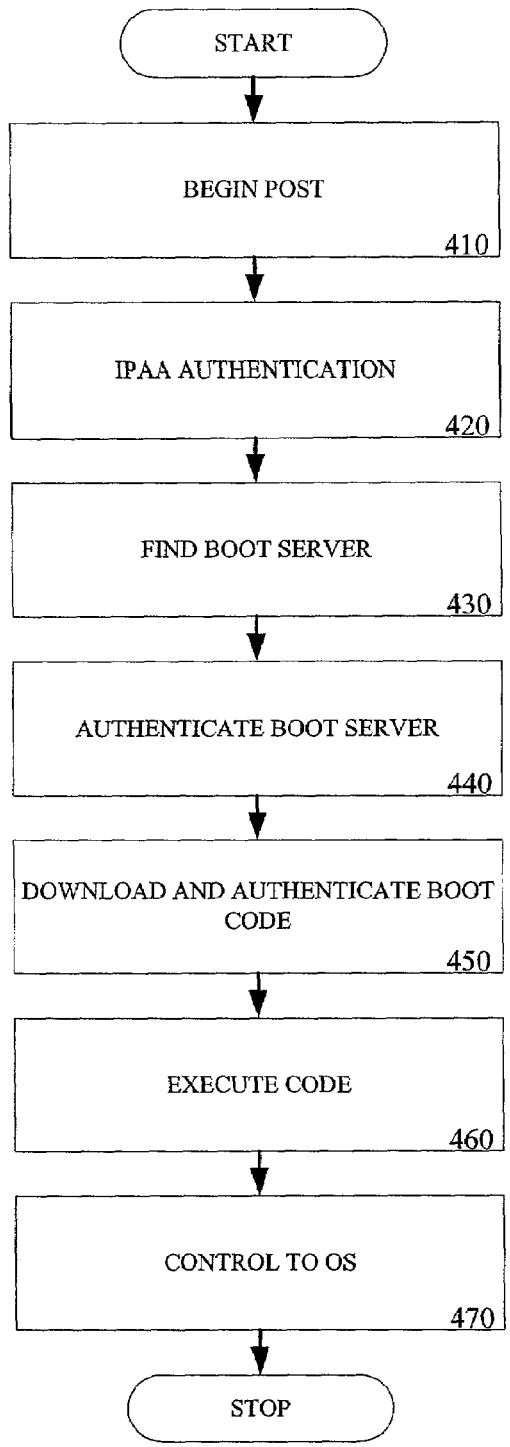
FIG. 4 is a flow diagram for one embodiment of a computer system upon being powered up or awaking from a sleep state.

FIG. 4 is a flow diagram for one embodiment of a computer system being powered up by a remote boot server.

At processing block 410, computer system 120 begins a power on self-test for system configuration (re-configuration). At processing block 420, computer system 120 begins user authentication. According to one embodiment, an IPAA service provider communicates with the remote boot server in order to authenticate the boot server. As a result, the remote boot server appears as a local authorized user at the computer system, and the booting process is allowed to continue.

In a further embodiment, the boot server accesses authentication stack 300 in order to authenticate the boot server. As a result, remote boot plug-in 358 within user authentication stack 300 is called upon to authenticate remote access. At processing block 430, computer system 120 finds the boot server (e.g., computer system 110) in order to download boot code. At processing block 440, computer system 120 authenticates the boot server. At processing block 450, the boot code is downloaded from the boot server to computer system 120 and authenticated.

Figure 5:
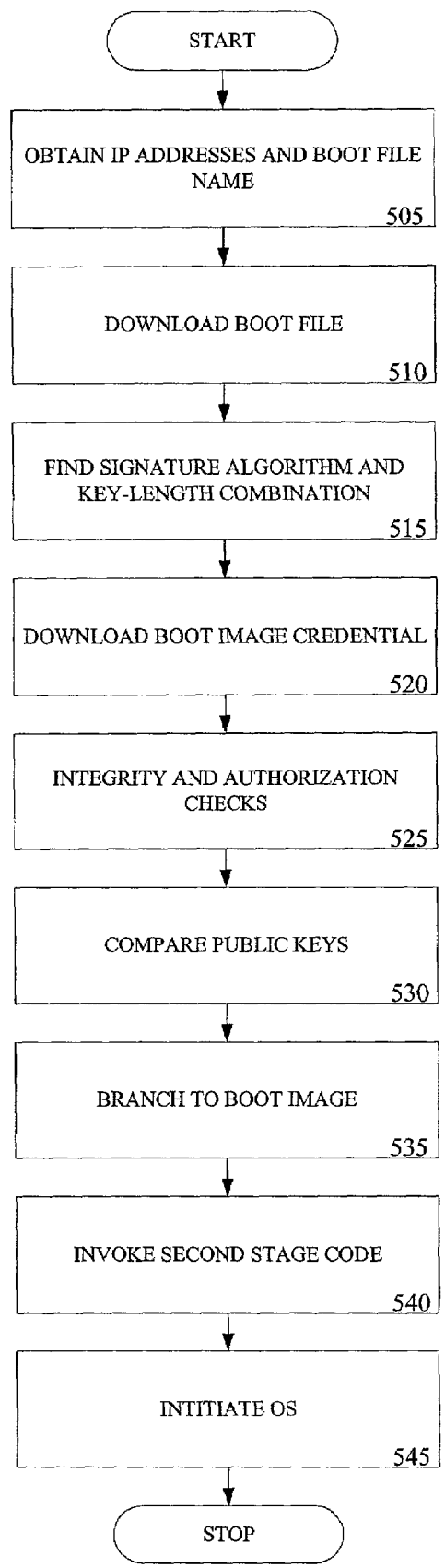
FIG. 5 is a flow diagram for one embodiment of the process for loading and authenticating a boot server and loading services.

FIG. 5 is a flow diagram for one embodiment of the process for loading and authenticating the boot server and loading the services. At processing block 505, remote boot code for network controller 221 (FIG. 2) of computer system 120 uses Dynamic Host Configuration Protocol (DHCP) to obtain an IP address for computer system 120, an IP address for computer system 110 and a boot file name. At processing block 510, the remote boot code uses a Preboot Execution Environment (PXE) code to download a boot file. At processing block 515, the remote-boot code finds a signature algorithm and key-length combination that the computer system 120 supports. In addition, the remote-boot code determines which corresponding boot image credential files to download from computer system 110.

At processing block 520, the remote-boot code downloads the corresponding boot image credential. At processing block 525, the remote-boot code performs an integrity and authorization check of the boot image. The integrity check must succeed in order for remote-boot to be authenticated. In one embodiment, the authorization check involves checking a signer's certificate supplied in the credential. At processing block 530, a public key in the certificate is compared against a public key in a boot object authorization certificate for computer system 120. If a match is not found, the boot attempt fails. If a match is found, the signature was generated by the accepted authority and the authorization check passes. Thus, the remote boot code branches to the downloaded boot image, processing block 535.

According to one embodiment, the first downloaded boot image is subject to tight size and memory model constraints. Consequently, the first download boot image is a first-stage bootstrap. In a further embodiment, the first download boot image includes a memory manager in order to make additional memory space available. In addition, the first downloaded boot image downloads a second stage bootstrap using a server, protocol, and file location that may be determined from information obtained in the first stage download. The second downloaded boot image has its own integrity and authorization credentials. In one embodiment, the source of authority for second-stage signature is the vendor of the software being booted. At processing block 540, the first stage code invokes the second stage code.

Referring back to FIG. 4, the boot code is executed at computer system 120, processing block 460. At processing block 470, control is passed to the operating system of computer system 120 once the code being downloaded from computer system 110 is authenticated.

According to another embodiment, computer system 120 can be awakened from a sleep state by a management computer (e.g., another computer system 110) that is to provide management services for computer system 120. Typically, this scenario occurs whenever computer system 120 has gone into a sleep mode due to inactivity, but is still connected to network 100. According to one embodiment, network controller 221 is still powered in the sleep mode and monitoring network 100 for wake-up packets.

Figure 6:
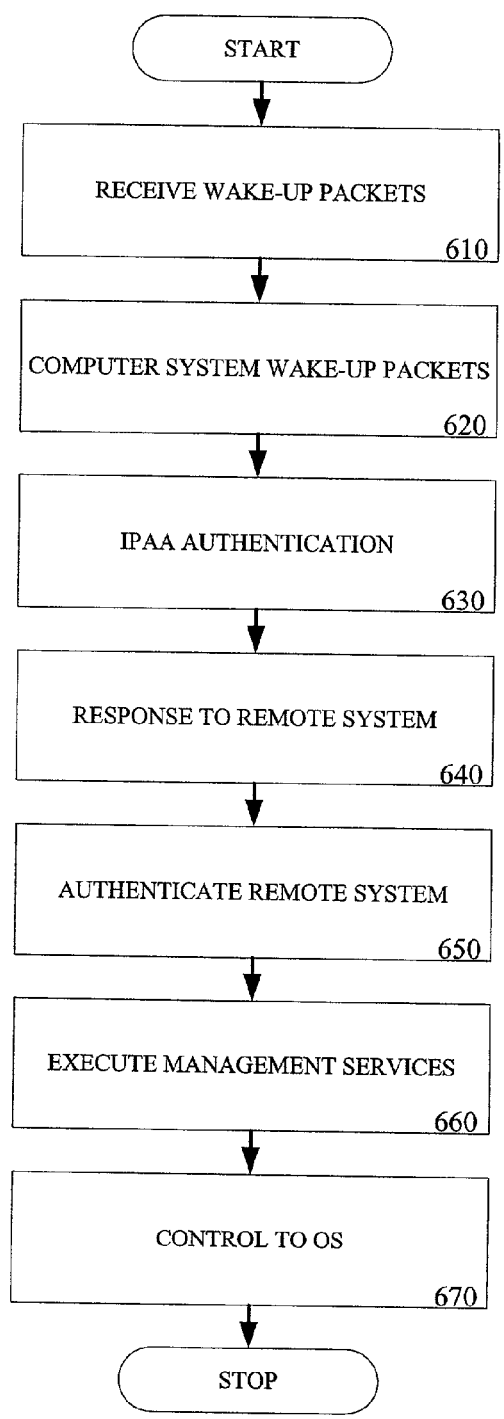
FIG. 6 is a flow diagram for one embodiment of awaking a computer system from a management services computer.

FIG. 6 is a flow diagram for one embodiment of awaking computer system 120 from a management services computer. At processing block 610, computer system 120 receives wake-up packets from computer system 110. The wake-up packet is received at network controller 221 within computer system 120. Subsequently, network controller 221 recognizes the wake-up packet and sends a wake-event to bridge/memory controller 211 (which is also still under power). As a result, bridge/memory controller 211 turns power back on to the full system.

At processing block 620, computer system 120 has awakened. Depending on how deep of a sleep computer system 120 was in determines the amount of system configuration needed to get everything back into a working state. Computer system 120 knows that this was a wake-up event, the type of wake event (S3, S4, etc.) and also which device woke it up. Since network controller 221 was responsible for the wake-up, computer system 120 determines that this was a wake-on-LAN scenario, and that computer system 120 needs to respond to the wake-up request from computer system 110. However, computer system 110 must first be authenticated. Therefore, at processing block 630, computer system 120 begins user authentication.

As described above, an IPAA service provider communicates with the computer system 110 for authentication. At processing block 640, computer system 120 responds to wake-up packets received from computer system 110. At processing block 650, computer system 120 authenticates computer system 110. At processing block 660, computer system 110 is allowed to execute the necessary management services at computer system 120. At processing block 670, control is passed to the operating system of computer system 120. In one embodiment, a private channel (or VPN) is established between computer systems 110 and 120 during authentication.

Referring back to FIG. 3, the hardware layer includes authentication hardware 360 and protected storage hardware 370, each coupled to a device communication medium. The hardware layer represents the actual hardware that is attached for the purpose of user authentication. According to one embodiment, hardware devices are attached externally via a USB. However, other external devices (e.g., RS-232, parallel port etc.) may be implemented. In other embodiments, hardware devices may be attached internally (e.g., low pin count (LPC), PCI bus and PC-card bus).

Authentication hardware 360 is hardware that captures data or used in process of authenticating data. Protected storage hardware 370 is the hardware (e.g., flash, ROM, etc.) that stores the data. In one embodiment protected storage hardware 370 is non-volatile storage that includes an access control. The access control determines which entities (e.g., user, program, etc.) have permission to read, write, modify or update the information stored within protected storage hardware 370. The authentication stack enables boot code that is to be downloaded from a boot server to be authenticated prior to control being passed to the operating system of the booting computer system.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A network comprising:
   a server computer; and
   a client computer, wherein the client computer accesses an authentication stack during a power on self-test (POST) that enables authentication of the remote server for authorization to boot the client computer, the authentication stack including:
   a control layer to control authentication;
   an interface layer to define function calls;
   a support layer to translate the function calls received from the interface layer into proprietary calls; and
   a hardware layer having one or more hardware devices.

2. The network of claim 1 wherein the control layer and the interface layer are implemented at the client computer, and the support layer and the hardware layer are implemented at the remote server.

3. The network of claim 1 wherein the control layer comprises:
   a user authentication (UA) control applet; and
   an application program interface (API) interface layer.

4. The network of claim 3 wherein the control applet finds, interprets and enforces a platform security policy that defines how to handle security related events.

5. The network of claim 4 wherein the security related event is remote local area network (LAN) wakeup event.

6. The network of claim 4 wherein the security related event is resume from suspend event.

7. The network of claim 4 wherein the security related event is an AT attachment 3 (ATA-3) event.

8. The network of claim 1 wherein the interface layer comprises:
   a UA API; and
   a storage API.

9. The network of claim 8 wherein the UA API defines high-level function calls for user authentication.

10. The network of claim 1 wherein the support layer comprises:
    an authentication support component; and
    a storage component.

11. The network of claim 10 wherein the support layer is developed by a service provider.

12. The network of claim 11 wherein the support layer translates API calls received from the interface layer into proprietary calls of the service provider.

13. The network of claim 10 wherein the support layer receives API function calls from the UA control applet and returns appropriate information.

14. The network of claim 10 wherein the storage component comprises a storage plug-in.

15. The network of claim 10 wherein the authentication support component comprises:
    fingerprint plug-in;
    a smart card plug-in;
    a universal serial bus (USB) token plug-in; and
    a remote boot plug-in.

* * * * *